United States Patent [19]

Morehouse et al.

[11] Patent Number: 5,189,576
[45] Date of Patent: Feb. 23, 1993

[54] ROTARY INERTIAL LATCH FOR DISK DRIVE ACTUATOR

[75] Inventors: James H. Morehouse, Jamestown; James A. Dunckley; David M. Furay, both of Boulder, all of Colo.

[73] Assignee: Integral Peripherals, Inc., Boulder, Colo.

[21] Appl. No.: 629,929

[22] Filed: Dec. 19, 1990

[51] Int. Cl.⁵ .......................... G11B 5/54; G11B 21/22
[52] U.S. Cl. .................................. 360/105; 360/106
[58] Field of Search .............................. 360/104–106, 360/109

[56] References Cited

U.S. PATENT DOCUMENTS

| | | |
|---|---|---|
| 3,984,873 | 10/1976 | Pejcha ................................. 360/105 |
| 4,518,904 | 5/1985 | MacLeod et al. .................... 360/78 |
| 4,535,374 | 8/1985 | Anderson et al. ................... 360/103 |
| 4,562,500 | 12/1985 | Bygdnes ............................. 360/98.01 |
| B1 4,568,988 | 11/1988 | McGinlay et al. .................... 360/77 |
| 4,568,988 | 2/1986 | McGinlay et al. .................... 360/77 |
| B1 4,638,383 | 11/1988 | McGinlay et al. .................... 360/77 |
| 4,638,383 | 1/1987 | McGinlay et al. .................... 360/77 |
| 4,647,997 | 3/1987 | Westwood ........................... 360/105 |
| 4,716,480 | 12/1987 | Wiens et al. ........................ 360/105 |
| 4,725,907 | 2/1988 | Jue ..................................... 360/105 |
| 4,839,756 | 6/1989 | Chew et al. ......................... 360/105 |
| 4,864,444 | 9/1989 | Liv et al. ............................. 360/105 |
| 4,884,261 | 11/1989 | Dalziel ................................ 360/105 |
| 4,933,785 | 6/1990 | Morehouse et al. ................. 360/78.04 |
| 4,996,617 | 2/1991 | Yaeger et al. ....................... 360/105 |
| 5,012,371 | 4/1991 | Pollard et al. ...................... 360/105 |
| 5,023,736 | 6/1991 | Kelsic et al. ........................ 360/105 |
| 5,036,416 | 7/1991 | Mastache ........................... 360/105 |

OTHER PUBLICATIONS

Quantum Corporation, *Technical Highlights:* Go-Drive Series, ProDrive Gem Series Sep. 1990, pp. 1–5 and 3 unnumbered pages.

*Primary Examiner*—Stuart S. Levy
*Assistant Examiner*—Jefferson Evans

[57] ABSTRACT

A rotary inertial latch is disclosed for maintaining the actuator of a disk drive in its proper position when the drive is not in operation.

11 Claims, 5 Drawing Sheets

ROTARY INERTIAL LATCH FOR DISK DRIVE ACTUATOR

FIELD OF THE INVENTION

This invention relates to the field of disk drives, and in particular to disk drives used in laptop, hand held or other small computers.

BACKGROUND OF THE INVENTION

In computer systems, information is frequently stored in a magnetic film on the surface of a hard or soft disk. The information is stored in concentric tracks in the magnetic film, and it is written to or read from the film by means of a magnetic head or transducer. When storing or retrieving data, the magnetic head rides on a thin laminar boundary layer of air over the rapidly rotating disk, thereby avoiding direct contact with the magnetic surface.

On most disk drives, the magnetic head or transducer is mounted near the end of a member commonly referred to as an actuator. Two configurations of actuators, linear and rotary, have been widely used. In the linear configuration, the actuator is mounted with the magnetic head pointing directly toward the center of the disk and the actuator moves linearly along a radial line to position the magnetic head at a desired position above the magnetic surface of the disk. In the rotary configuration, the actuator rotates about a pivot point near the circumference of the disk, with the magnetic head swinging so as to define an arc over the surface of the disk.

Two further categories of disk drives are defined by the position of the read/write head when the drive is not operating. In "dynamic loading" drives, the head is withdrawn to a position away from the disk (typically on a ramp), whereas in "contact start/stop" (CSS) drives, the head is moved to a "park" position, that is, a position on a nondata zone of the disk (typically near the center) which is reserved for take-offs and landings and resting when the CSS drive is not operating. When the drive is not operating, it is important that the head be restrained on its ramp or other restraining structure if the drive is a dynamic loading type, and that it be restrained in its "park" position on the surface of the disk if the drive is a CSS type. Any abnormal contact between the head and the disk may create a stiction or adhesion or may otherwise damage the head and/or the disk.

Several mechanisms have been proposed to lock the actuator in its proper position when the drive is not in operation. In some drives, the actuator becomes engaged to a passive magnetic or spring-loaded latch when the drive is turned off, the holding force of the latch being overcome by the actuator motor when the drive is turned on again. These mechanisms are vulnerable to becoming disengaged and releasing the actuator if the computer is subjected to a shock force, for example by being bumped or dropped, while not in operation.

Other protective mechanisms rely on a spring-loaded latch and solenoid, the solenoid allowing the spring-loaded latch to restrain the actuator when the power is off and being energized so as to release the actuator when the power is on. While such mechanisms do provide some measure of protection against shock forces when the drive is not operating, solenoid latches tend to be expensive and unreliable, and they consume power while the drive is operating. Moreover, since a very weak spring must be used to avoid the need for a large power-consuming solenoid, even a solenoid latch may be disengaged if the computer is subjected to a strong external shock force. Examples of such mechanisms are disclosed in U.S. Pat. No. 4,716,480, issued Dec. 29, 1987 to Wiens et al., and U.S. Pat. No. 4,725,907, issued Feb. 16, 1988 to Jue, both of which operate with linear rather than rotary actuators.

Rotary actuators are particularly vulnerable to rotational shocks and acceleration. Since a rotary actuator can be designed so that it is substantially balanced with respect to its pivot point, a purely translational shock will operate equally on both ends and will not cause the actuator to move with respect to the rest of the disk drive. Any small imbalances that are due to typical manufacturing variations will not normally create an inertial force large enough to overcome a passive latching mechanism. On the other hand, it is critical to provide protection against the inertial forces arising from rotational shocks, since these may easily cause the rotary actuator to swing about its pivot point, thereby bringing the magnetic head into unwanted contact with the disk. This need has become all the more pressing with the advent of laptop and even smaller computers. These computers operate in a particularly severe environment, and they may readily be subjected to strong rotational forces as they are jarred, bumped and sometimes dropped when being carried about or otherwise not in use.

SUMMARY OF THE INVENTION

In a inertial latch according to this invention, an inertial body is mounted on a shaft which is substantially parallel to the axis about which a rotary disk drive actuator pivots. The inertial body includes a pin or other member which is capable of engaging a corresponding finger or other member on the actuator so as to prevent the actuator from rotating. The inertial body is free to rotate about its shaft, but a small spring biases it in an unlocked position, with the corresponding locking members of the inertial member and actuator held apart, when the computer is not being subjected to rotational forces.

On the other hand, when the computer is subjected to a strong rotational force or shock, the main body of the disk drive accelerates angularly in the direction of the force. The inertial body is free to rotate, however, and since its moment of inertia is sufficient to overcome the force of the spring, it does not accelerate with the rest of the disk drive. The result is relative rotation between the inertial body and disk drive which, assuming that the shock is in a direction which would tend to swing the head toward the disk, brings the corresponding locking members of the inertial body and actuator into engagement and thereby prevents the actuator from angular movement with respect to the remainder of the disk drive.

An inertial latch in accordance with the invention is simple, reliable and consumes no electrical power. This makes it particularly suitable for miniature computers, which are often battery operated.

While an inertial latch is described herein in conjunction with a disk which stores information in a magnetic medium, the principles of this invention are equally applicable to disk drives which use other types of storage disks, for example, magneto-optic and conventional phonographic disks. Moreover, the principles of this invention are applicable to CSS disk drives and "dynamic loading" drives alike.

DETAILED DESCRIPTION OF THE INVENTION

Figure 1:
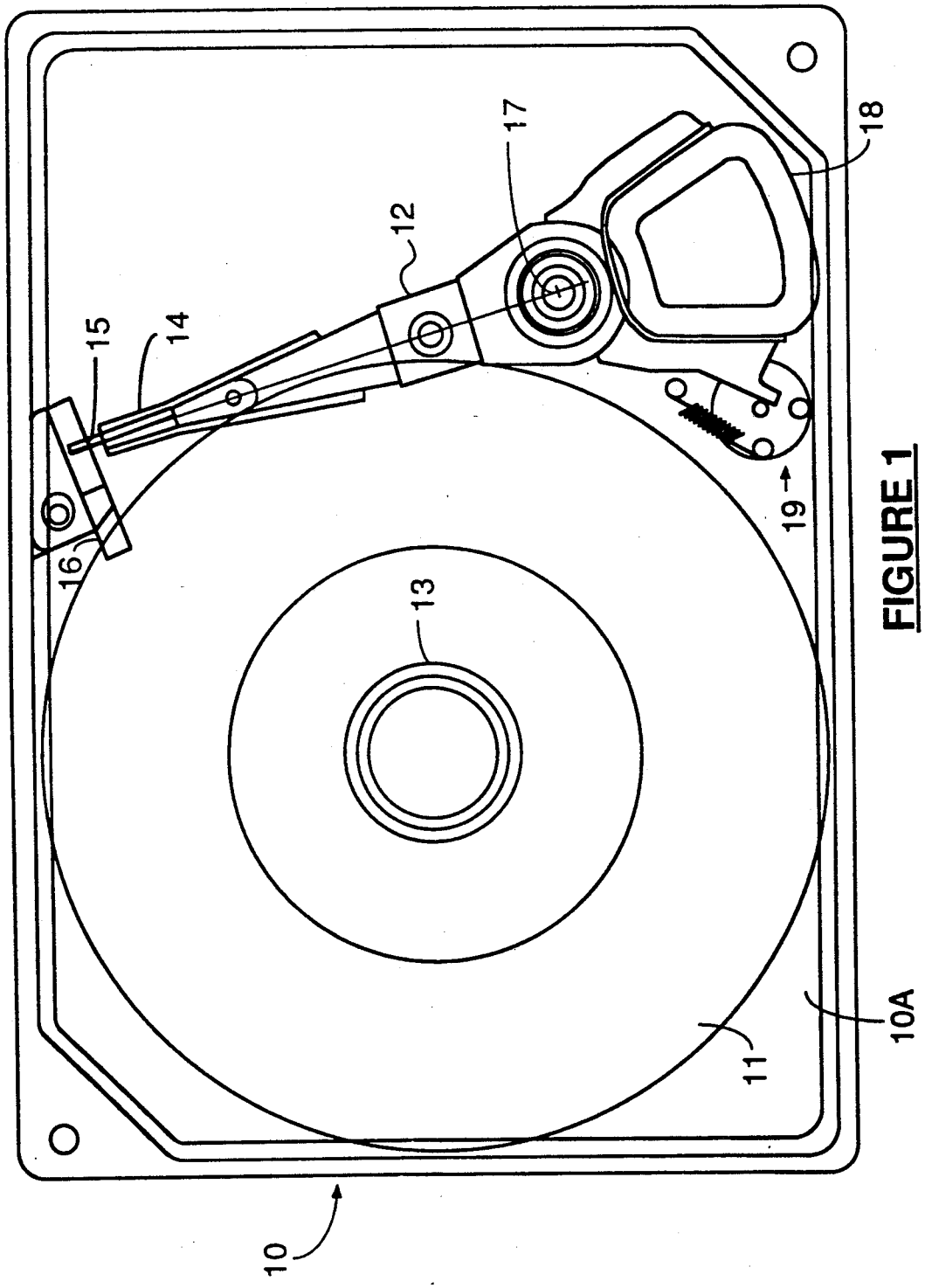
FIG. 1 is a general overhead view of a dynamic loading disk drive, showing the relative positions of a rotary actuator and an inertial latch in accordance with this invention.
Figure 3:
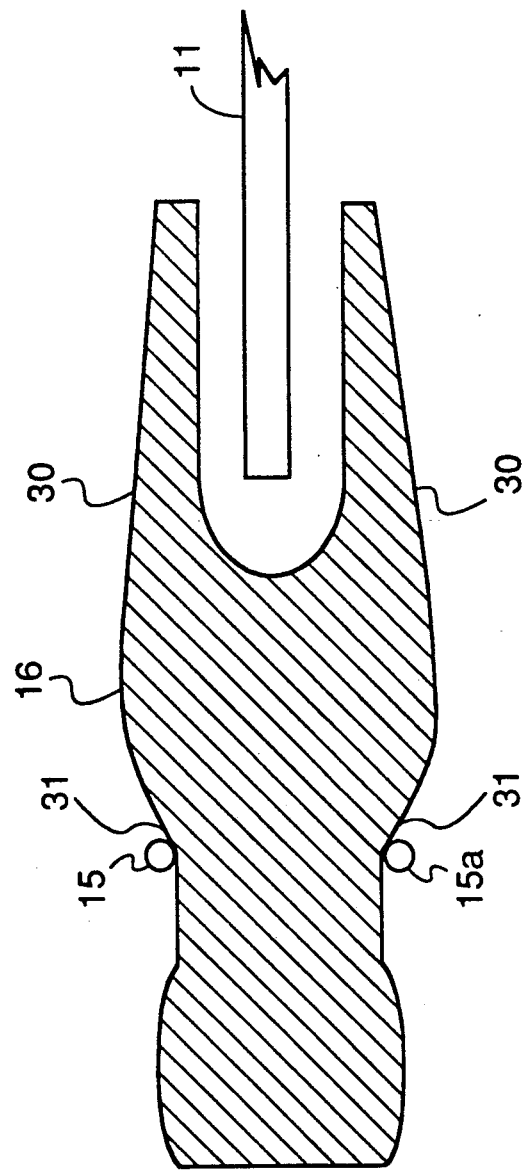
FIG. 3 is a side view of the ramp and related elements shown in FIG. 1.

FIG. 1 shows a general overhead view of a dynamic loading disk drive 10, which includes a drive body 10A, a disk 11 and a rotary actuator 12. Disk 11 is driven by and rotates around a combined spindle and motor 13. At one end of actuator 12 are mounted a magnetic head 14 and a cam follower 15, the latter of which rides on a ramp 16. FIG. 3 shows the structure of cam follower 15 and ramp 16 in more detail.

Actuator 12 rotates about pivot shaft 17 and is driven by an actuator coil 18 in conjunction with a magnet assembly (not shown) which together make up a voice coil motor which swivels actuator 12 so as to position magnetic head 14 over a desired location on disk 11. Positioned adjacent an end of actuator 12 is an inertial latch 19, which will now be described in greater detail with reference to FIG. 2A.

Figure 2A:
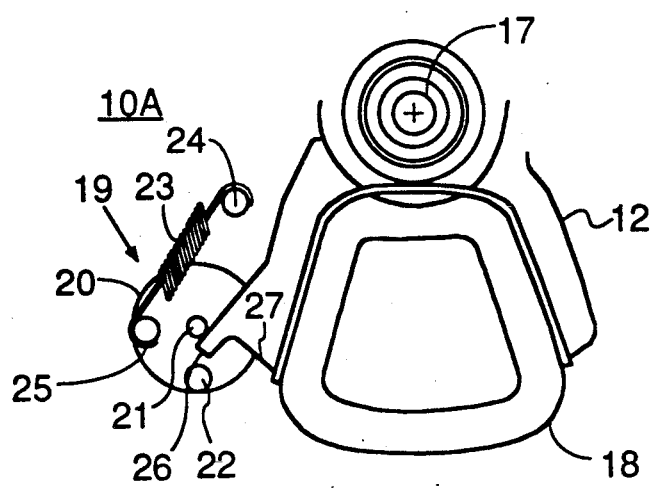
FIGS. 2A and 2B show a portion of a rotary actuator and an inertial latch in accordance with the invention, with the latch in unlocked and locked positions, respectively.

FIG. 2A shows inertial latch 19 when it is in an open or unlocked condition. One end of a shaft 21 is journaled into an inertial body 20 so as to allow inertial body 20 to rotate in either direction. The other end of shaft 21 is attached to body 10A. Inertial body 20 is shown as being circular in FIG. 2A, but this is not in any respect intended to be limiting. Inertial body 20 may be configured in virtually any shape, since its shape is not critical to its operation. A locking pin 22 is attached to the surface of inertial body 20. When inertial latch 19 is in its unlocked condition, as shown in FIG. 2A, the angular position of locking pin 22 about shaft 21 is determined by a coil spring 23, which extends between a pin 24 joined to drive body 10A and a pin 25 joined to inertial body 20. A finger 26 protrudes from actuator 12, adjacent to which is a striking surface 27, which is aligned to be in the path of pin 22 as it rotates in a counterclockwise direction.

When drive 10 is not operative, magnetic head 14 is normally restrained by the structure shown in FIG. 3, which shows ramp 16 viewed from the side away from actuator 12. This structure is described in greater detail in copending and commonly assigned U.S. Pat. application Ser. No. 07/629,948, of J. Morehouse et al. filed on Dec. 19, 1990 and entitled: "Miniature Hard Disk Drive For Portable Computer" which is incorporated herein by reference in its entirety. As shown in FIG. 3, cam follower 15 is mirrored by a similar cam follower 15a beneath ramp 16. Cam followers 15 and 15a encounter inclines 30 on ramp 16 when they swing away from disk 11. As cam followers 15 and 15a slide further leftward along inclines 30, magnetic head 14 is lifted away from the surface of disk 11, until cam followers 15 and 15a reach locking positions 31. A stop (not shown) prevents cam followers 15 and 15a from moving substantially beyond locking positions 31.

Figure 2B:
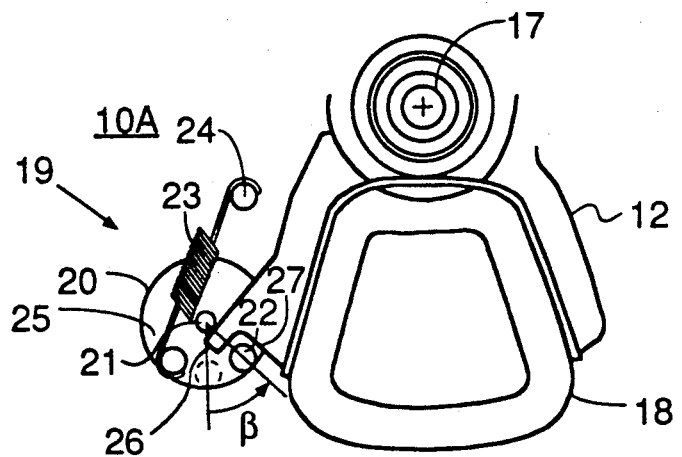

The operation of inertial latch 19 will now be described. When the disk drive is turned off, cam followers 15 and 15a normally rest in locking positions 31, and inertial latch 19 is in the unlocked condition shown in FIG. 2A. The frictional force between cam followers 15 and 15a and ramp 16 is enough to restrain actuator 12 from swinging as a result of a minor rotational shock. If disk drive 10 incurs a strong clockwise rotational force, however, actuator 12 will tend to rotate in a counterclockwise direction with respect to body 10A, potentially allowing magnetic head 14 to make contact with disk 11. In this case, the inertia of inertial body 20 will overcome the force of spring 23, and inertial body 20 will also rotate in a counterclockwise direction with respect to body 10A. Pin 22 will therefore rotate through an angle $\beta$ as shown in FIG. 2B until it strikes surface 27. In this position, pin 22 blocks any appreciable movement of arm 26 to the right and thereby prevents actuator 12 from rotating in a counterclockwise direction. Following the shock, spring 23 will urge inertial body 20 back to the unlocked position shown in FIG. 2A, and cam followers 15 and 15a will return to locking positions 31.

If disk drive 10 incurs a strong counterclockwise force, no problem will arise since actuator 12 will tend to rotate clockwise with respect to body 10A until it reaches the stop (not shown), after which cam followers 15 and 15a will return to locking positions 31.

It will be apparent that the effective operation of inertial latch 19 depends in part on the correct adjustment of the torque impressed by spring 23 on inertial body 20 as compared with the moment of inertia of inertial body 20. In practice, it has been found that spring 23 should exert just enough force to maintain latch 19 in an unlocked condition when disk drive 10 is not being exposed to significant rotational forces.

It should be stressed that the configuration shown in FIGS. 2A and 2B, including inertial body 20, pin 22 and finger 26 is illustrative only. As noted above, inertial body 20 need not be round and can in fact assume a wide variety of shapes and sizes. Pin 22 and finger 26 may be replaced by any two members or devices which are capable of engaging or interlocking in any way upon the rotation of inertial body 20, so as to prevent actuator 12 from rotating in a manner to threaten contact between magnetic head 14 and disk 11. While inertial body 20 is shown as being positioned under actuator 12, this relationship likewise need not be adhered to. Inertial member 20 could be below actuator 12, above actuator 12, laterally adjacent actuator 12, or any combination of the foregoing. Moreover, inertial latch 19 need not be located at the position on housing 10A shown in FIG. 1 and FIGS. 2A and 2B. It can be located at a position adjacent any portion or surface of actuator 12. The moment of force applied by inertial latch 19 against the unwanted rotation of actuator 12 will, of course, be greater to the extent that inertial latch 19 is distanced from pivot 17.

Spring 23 may likewise be replaced by a variety of mechanisms that will maintain inertial latch 19 in an unlocked condition and prevent it from locking inadvertently when disk drive 10 is not being subjected to a rotational force. For example, an elastic or elastomeric device could be used in place of spring 23. A torsional spring could be placed around shaft 21, or spring 23 and shaft 21 could be integrated into a flexural spring pivot. A passive magnet might also be used to hold inertial member 20 in an unlocked position in normal situations.

Figure 4:
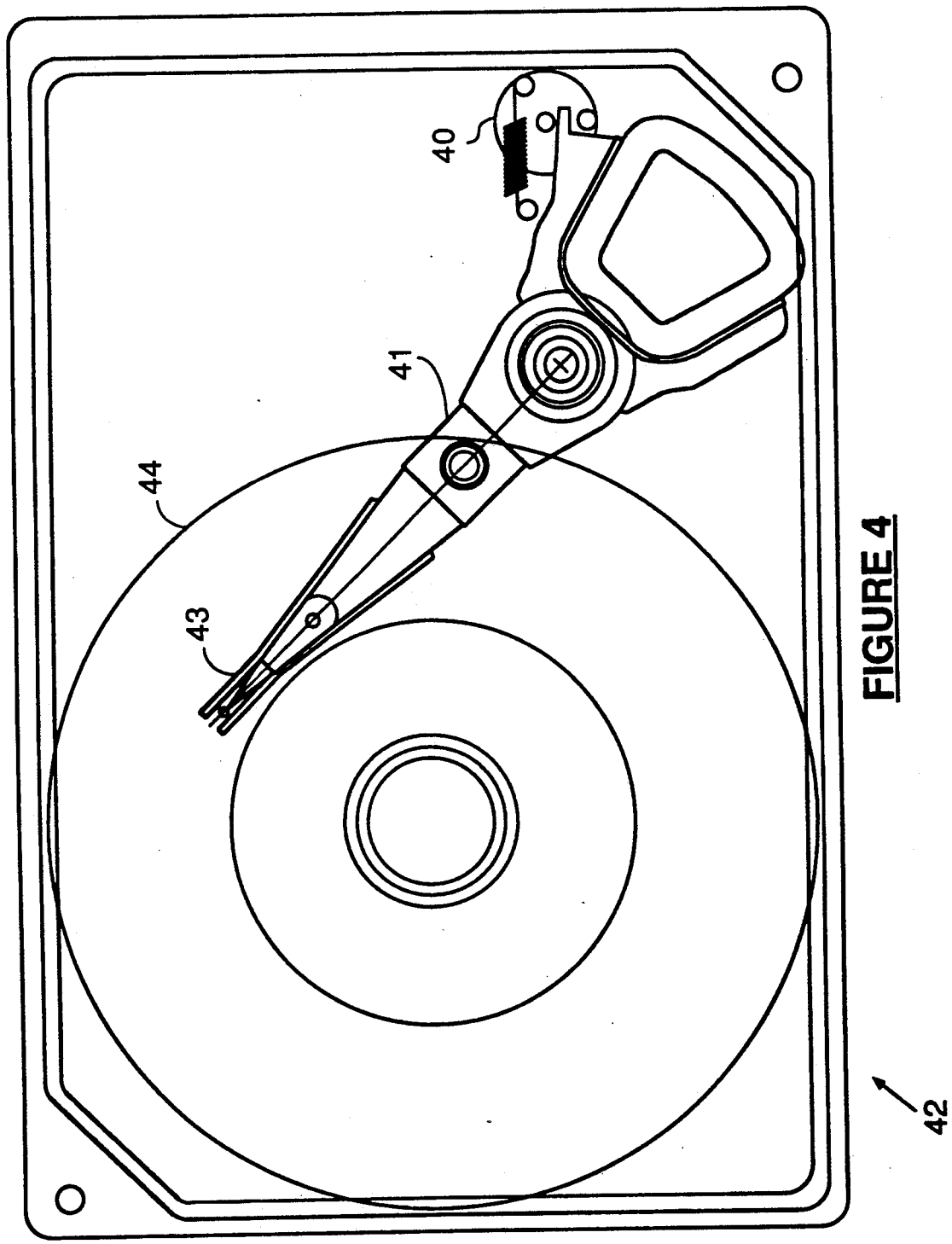
FIG. 4 is an overhead view of a contact start/stop (CSS) disk drive having an inertial latch in accordance with the invention.

An inertial latch according to this invention may also be used with a contact start/stop disk drive. Such an embodiment is shown in FIG. 4, where an inertial latch 40 is configured so as to prevent clockwise rotation of an actuator 41 with respect to the remainder of a contact start/stop disk drive 42. A head 43 is shown in its "parking" position on an inner portion of a disk 44 while disk drive 42 is not in operation. FIG. 4 shows inertial latch 40 in a locked condition, preventing head 43 from sliding across disk 44 in a clockwise direction when drive 42 encounters a counterclockwise rotational force.

The foregoing examples of various embodiments and aspects in accordance with this invention are intended to be illustrative only and not in any manner limiting of the full scope of this invention. Those skilled in the art will be able to recognize or conceive of numerous alternative embodiments which are within the broad scope and principles of this invention.

We claim:

1. A disk drive for storing and/or retrieving information comprising:
   a disk comprising a storage medium and rotatable about an axis;
   means for rotating said disk;
   an actuator rotatable about a pivot and comprising a head for storing information in and/or retrieving information from said storage medium; and
   an inertial latch for preventing rotation of said actuator with respect to said disk drive when said disk drive is subjected to a rotational force, said inertial latch comprising:
   an inertial body rotatable about an axis;
   engagement means joined to said inertial body, said engagement means being capable of engaging said actuator so as to prevent said actuator from rotating about said pivot when said disk drive is subjected to a rotational force; and
   bias means for biasing said engagement means such that said engagement means engages said actuator only when said disk drive is being subjected to an external rotational force.

2. The disk drive of claim 1 wherein said engagement means comprises a pin joined to said inertial body.

3. The disk drive of claim 1 wherein said biasing means comprises a spring connected to said inertial body.

4. The disk drive of claim 1 wherein said disk drive is a dynamic loading disk drive.

5. The disk drive of claim 4 which also comprises a second latch means for preventing said head from making contact with said disk, said second latch means not being activated by a rotational force imposed on said disk drive.

6. The disk drive of claim 5 wherein said second latch means comprises a cam follower joined to said actuator, and a ramp, said second latch means operating at least in part by means of friction between said cam follower and said ramp.

7. The disk drive of claim 1 wherein said disk drive is a contact start/stop disk drive.

8. The disk drive of claim 1 wherein said storage medium is a magnetic material.

9. The disk drive of claim 1 wherein said storage medium is a magneto-optic material.

10. The disk drive of claim 1 wherein said actuator includes an electrically conductive coil and wherein said actuator is driven by a voice coil motor.

11. The disk drive of claim 1 wherein said bias means prevents said inertial body from rotating about said axis unless said disk drive is subjected to a rotational force of a predetermined magnitude.

* * * * *